United States Patent [19]

Bingham

[11] 4,114,286
[45] Sep. 19, 1978

[54] DRYERS FOR LETTUCE AND LIKE SALAD COMPONENTS

[76] Inventor: Lowell Bingham, 130 Laurelwood Dr., Pittsburgh, Pa. 15237

[21] Appl. No.: 672,422

[22] Filed: Mar. 31, 1976

[51] Int. Cl.² .................. A47J 43/04; F26B 11/08
[52] U.S. Cl. ........................... 34/58; 99/495; 233/23 R
[58] Field of Search ............. 99/484, 495, 503, 508, 99/511-512; 210/360 R, 367, 378, 381; 68/23.3; 34/58; 233/2, 1 R, 1 B, 1 C, 23 A, 23 R

[56] References Cited

U.S. PATENT DOCUMENTS

| | | | |
|---|---|---|---|
| 1,013,164 | 1/1912 | Hudlow et al. | 233/23 R |
| 1,055,938 | 3/1913 | Molinari et al. | 210/367 |
| 2,844,176 | 7/1958 | Barrows | 99/512 |
| 3,885,321 | 5/1975 | Fouineteau | 210/360 R |

Primary Examiner—Harvey C. Hornsby
Assistant Examiner—Robert Pous
Attorney, Agent, or Firm—Buell, Blenko & Ziesenheim

[57] ABSTRACT

A lettuce and like dryer is adapted for use with a conventional blender apparatus or other appliances such as an electric juicer having a vertical drive shaft, the dryer including an outer basket having a top opening and a bottom having a generally annular reservoir and an axial opening, engaging means at the bottom axial opening adapted to engage the housing of said blender, an inner axial stub shaft connected to gear drive means mounted in said bottom opening and adapted to engage the blender drive shaft and perforate basket means removably engaging said stub shaft to be driven thereby.

5 Claims, 5 Drawing Figures

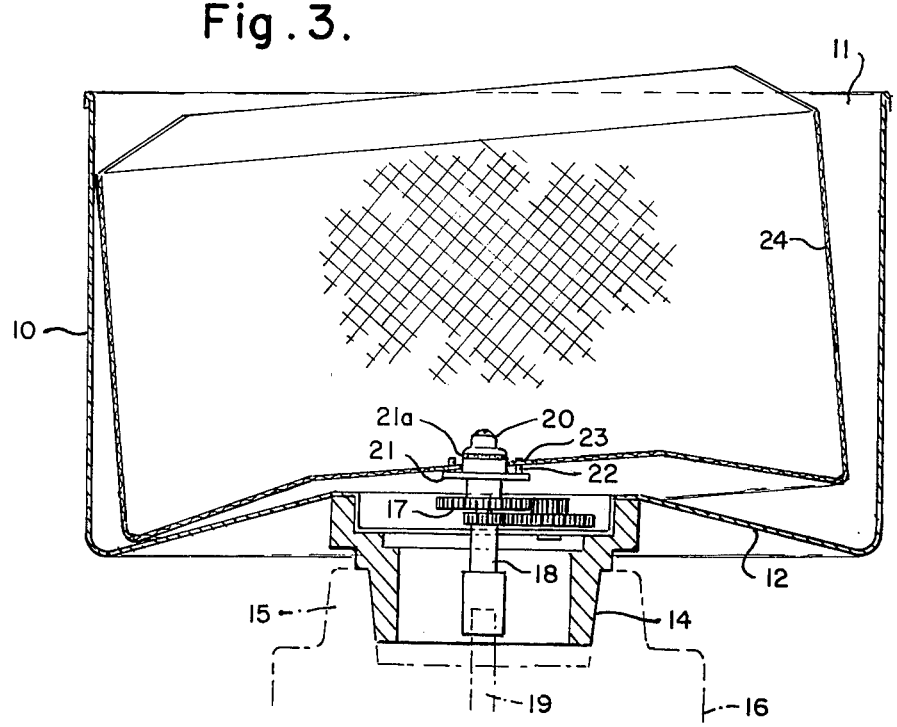
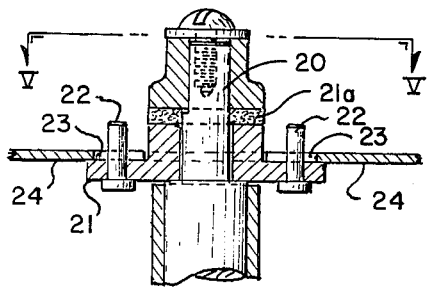
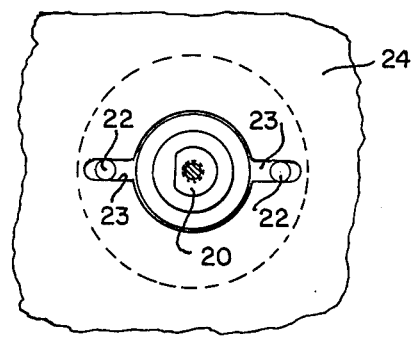

DRYERS FOR LETTUCE AND LIKE SALAD COMPONENTS

This invention relates to dryers for lettuce and like salad components and particularly to a dryer for use with a conventional household blender or juicer.

The problem of removing water from lettuce and other leafy salad components and the like is well known. Many housewives after washing such salad "greens" dry the same with towels in order to remove the excess water. This is, of course, a slow, tedious and generally irritating chore which produces wet towels, wet and sometimes chapped hands and lost time. There have been attempts made to provide a dryer for this sort of problem. For example, U.S. Pat. No. 3,753,297 to Mantelet provides a hand driven rotary basket for this purpose. There are, however, to applicant's knowledge, no satisfactory small power driven dryers adapted for this purpose.

The present invention provides a simple dryer for lettuce and the like adapted for use with a conventional blender such as is available in most households.

I provide an outer housing preferably cylindrical having a top opening and having an annular reservoir and an axial bottom opening, engaging means at said bottom opening adapted to engage the housing of a conventional blender, an inner axial stub shaft connected to gear drive means mounted in said bottom opening, said drive means being adapted to engage the drive shaft of said conventional blender and perforate inner basket means removably engaging said stub shaft to be driven thereby. Preferably the engaging means is an inverted frusto conical socket adapted to fit into and frictionally engage the holding yoke of a conventional blender, however, other suitable engage means such as a rubber friction disc, rubber feet, etc. are contemplated.

In the foregoing general description I have set out certain objects, purposes and advantages of my invention. Other objects, purposes and advantages of this invention will be apparent from a consideration of the following description and the accompanying drawings in which:

FIG. 3 is a vertical section through the embodiment of FIG. 1 showing the inner perforate basket in unbalanced state;

FIG. 4 is an enlarged fragmentary section of the spider, vertical fingers and clutch of FIG. 1; and FIG. 5 is a fragmentary section on line IV—IV of FIG. 4.

Figure 1:
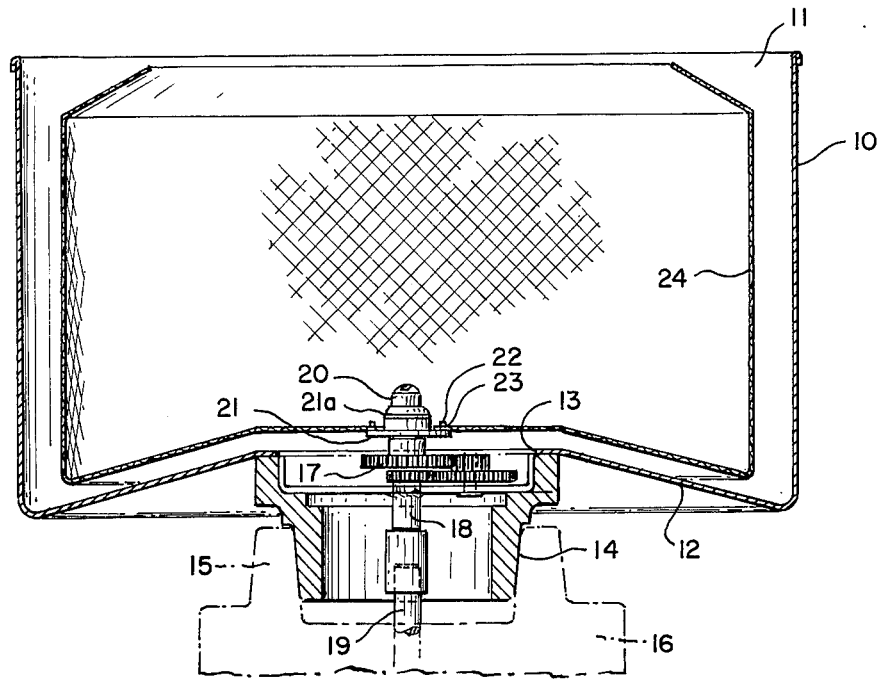
FIG. 1 is a vertical section through a preferred embodiment of my invention.

Referring to the drawings I have illustrated an outer imperforated stationary basket 10 in the form of a cylinder having an open top 11 and a generally frusto conical bottom 12 extending upwardly from the sidewalls of the basket to an axial opening 13. A frusto conical socket 14 is fixed to the bottom 12 around opening 13 and is adapted to fit within yoke 15 of a conventional blender 16. A reduction gear train 17 is mounted in opening 13. The gear train 17 includes a vertical driven shaft 18 adapted to engage the drive shaft 19 of a conventional blender 16. A second concentric drive shaft 20 extends vertically out of opening 13 and drives a spider 21 having upward projecting fingers 22 which engage openings 23 in an inner perforate basket 24. The spider 21 is driven through a friction clutch 21a. The frictional clutch means may be any of the well known frictional clutch constructions. It is used to protect the hands of the user so that in the event the user contacts the basket while it is rotating, it will stop rather than abrade or injure the user's hand.

In operation the outer basket 10 is placed on blender 16 with socket 14 in yoke 15. The lettuce to be dried is placed in the inner perforate basket 24 which is free to tilt on fingers 22 to provide a visual indication of load imbalance. If too much load is placed on one side of basket 24 it simply tilts on finger 22, rising on the light side and dropping on the heavy side until the top edge touches the inside of the outer basket 10. This indication of imbalance is obviously desirable to prevent nutation of the basket in operation. The blender is turned on and basket 24 is rotated throwing water from the lettuce through the perforations in basket 24 into the outer basket 10 where it collects in the depression or reservoir 12a surrounding bottom 12. Basket 24 is easily removable to dump the lettuce.

Figure 2:
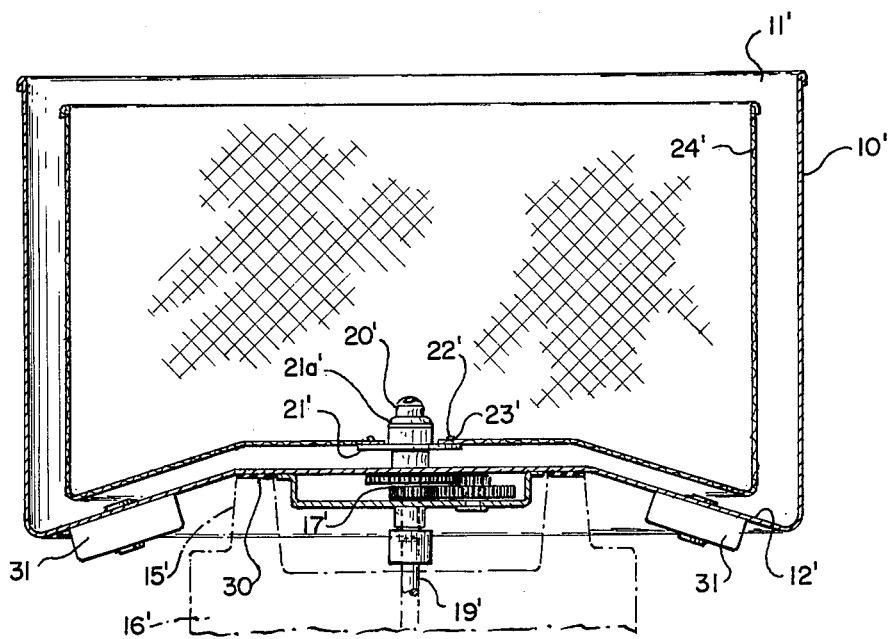
FIG. 2 is a fragmentary vertical section through a second embodiment of my invention.

The second embodiment shown in FIG. 2 is generally similar to that of FIG. 1 and the like parts bear like numbers with the prime suffix. This embodiment differs from that of FIG. 1 by omitting the socket 14 and substituting therefore a rubber pad 30 which surrounds opening 13' and frictionally engages the top of blender yoke 15'. Weights 31 are provided in the bottom 12' of the outer basket 10' to hold the outer basket 10' onto the blender.

In the foregoing specification I have set out certain preferred embodiments of my invention, however, it will be obvious that this invention may be otherwise embodied within the scope of the following claims.

I claim:

1. In combination a lettuce and like dryer consisting essentially of a conventional blender apparatus having a vertical shaft, an outer imperforate basket having a top opening and a bottom with a generally annular peripheral reservoir collecting moisture discharged from said lettuce, and an axial opening engaging means at the bottom opening engaging the housing of said conventional blender, an inner axial stub shaft connected to gear drive means mounted in said bottom opening, said drive means engaging the drive shaft of said conventional blender and perforate basket means coaxial within said outer basket and freely removable through the top opening adapted to receive lettuce and the like to be dried and to hold the same spaced from moisture collected in the annular reservoir, said perforate basket freely pivotably, and removably engaging said stub shaft to be driven thereby, said stub shaft being provided with a spider having upwardly extending vertical fingers freely engaging openings in the bottom of the perforate inner basket means permitting the basket to tilt relative to said fingers in response to load imbalance to provide a visual imbalance indicator.

2. A lettuce and like dryer as claimed in claim 1 wherein the engaging means is a frusto conical socket adapted to engage frictionally within the holding yoke of a conventional blender.

3. A lettuce and like dryer as claimed in claim 1 wherein the annular reservoir is formed by a generally frusto conical bottom member extending upwardly from the outer periphery of the outer basket to the opening in the bottom.

4. A lettuce and like dryer as claimed in claim 1 wherein the engaging means is a friction pad surrounding the opening in the bottom of the outer basket.

5. A lettuce and like dryer as claimed in claim 1 wherein the spider engages the stub shaft through a friction slip clutch.

* * * * *